May 2, 1933.  C. W. McKINLEY  1,906,391
FILTER
Filed April 17, 1931
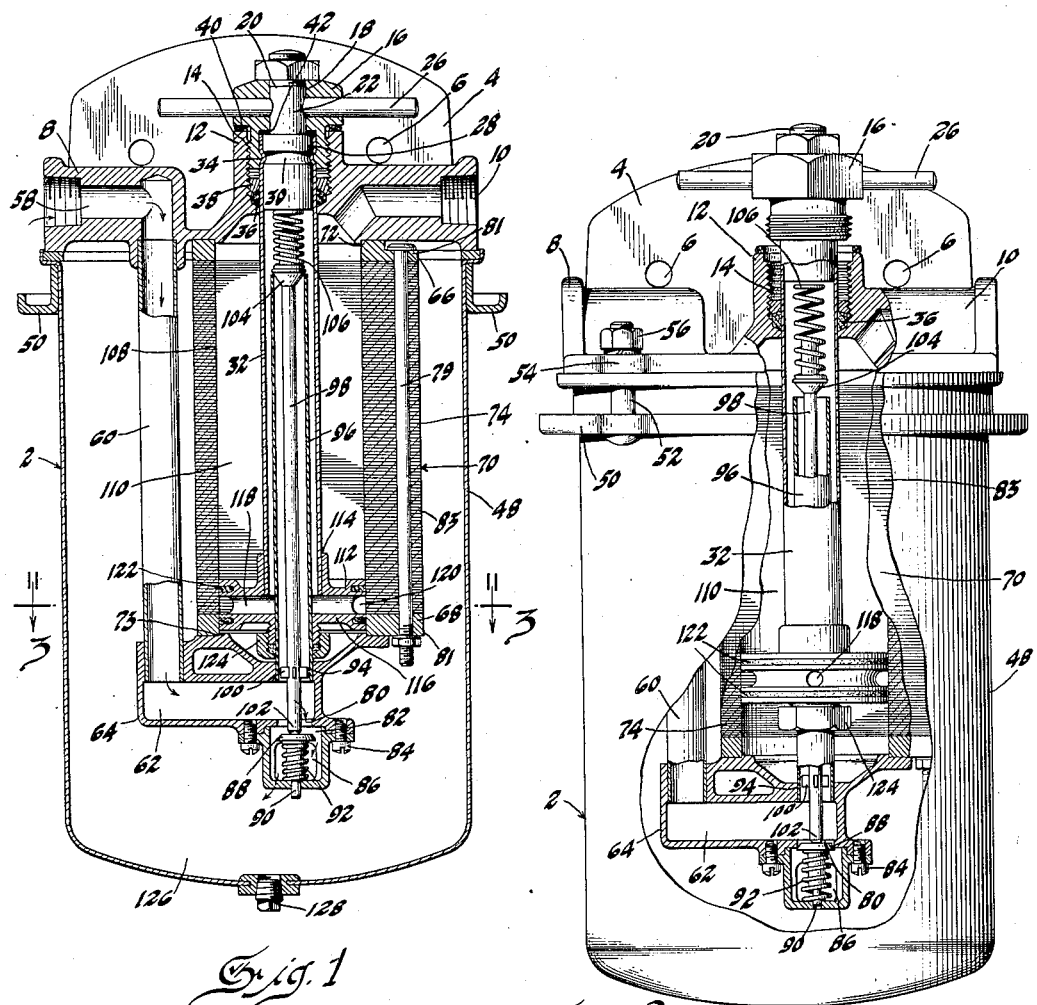
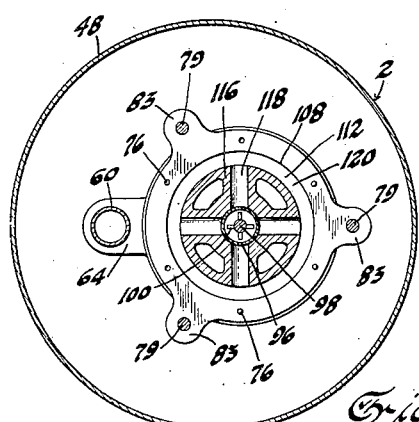
Inventor
Charles W. McKinley Patented May 2, 1933

1,906,391

UNITED STATES PATENT OFFICE

CHARLES W. McKINLEY, OF FLINT, MICHIGAN, ASSIGNOR TO A C SPARK PLUG COMPANY, OF FLINT, MICHIGAN, A CORPORATION OF MICHIGAN

FILTER

Application filed April 17, 1931. Serial No. 530,841.

This invention relates to filters and has particular reference to improvements in the type of filters known as the metal plate edge filters.

The invention has for is principal object to equip a filter of the type mentioned with a device for cleaning it while the filter is in operation by reversing the flow of fluid through successive sections of the filter. In the cleaning of the filter of the present invention, it is unnecessary to remove the filter from the circuit or to dismantle it in any way.

The object of the invention is accomplished by placing in the filter container a number of metal plates or discs which are spaced from each other by a plurality of knobs or projections formed on each sheet. A stack of these sheets is suitably held between top and bottom plates. The liquid to be cleaned is delivered into the receptacle between the receptacle and the stack of filter plates and pressure forces the liquid between the plates but owing to the narrow spaces therebetween, the impurities will be retained at the filter edge. After the filter has been operating for a period of time, it will become clogged owing to the accumulation of impurities. To clean the filter, there is provided a disc or wheel having a groove on its periphery. This groove communicates with passages or openings in the spokes so that any liquid delivered to the spokes will be forced to the periphery. The wheel or disc is positioned interiorily of the stack of filter plates and is provided with a means for moving it along the plates. By forcing the incoming fluid to pass to the wheel and by slowly drawing the wheel along the stack of filter plates, the fluid is forced between the plates in the opposite direction. Owing to the high pressure applied to the small area presented by the groove in the wheel's periphery, a considerable quantity of liquid is forced between the plates and an effective cleaning obtained. The impurities forced from the filter in the cleaning operation will settle to the sump at the bottom of the filter container. A suitable system of valves is provided for controlling the flow of fluid to operate the cleaner.

On the drawing:

Figure 1 is a sectional view through the filter of the invention showing the parts in the position they occupy when the filter is functioning normally.

Figure 2 is a partial sectional view showing the parts in the position they occupy when the filter is being cleaned.

Figure 3 is a section on the line 3—3 of Figure 1.

Figure 4 is an enlarged sectional view of two of the plates showing the indentations or projections thereon to form the spacing means.

Referring to the drawing, the numeral 2 indicates the filter as a whole. The filter has the bracket 4 at its upper portion provided with the openings 6 by means of which it is attached to a suitable support. The bracket includes the inlet 8 and the outlet 10. A central boss or projection 12 is positioned between the inlet and outlet 8 and 10. The boss 12 is internally threaded as indicated at 14 and receives the threaded end of a nut 16. The nut has a bore 18 to receive the reduced end 20 of a mounting member 22. The nut 16 and mounting member 22 have mating transverse openings in which there is received the handle 26 to serve as a convenient means manually to turn the nut 16 and the mounting member 22. The inner portion 22 of the mounting member is enlarged and is received in the enlarged portion 28 of the bore 18. The mounting member has an annular groove 30 in which there is pressed the end of the tube 32, as shown at 34, to form a fluid tight connection. The end of the tube 32 also extends into the enlarged portion 28 of the bore 18.

A suitable packing 36 and a screwthreaded washer 38 form a fluid tight connection between the pipe 32 and the boss 12. Suitable gaskets 40 and 42 are also used to form liquid tight connections.

A container 48 is secured to the bracket 4 by means of the ring 50 and the bolts 52. The bolts 52 pass through mating openings in the ring and in ears 54 on the bracket 4. Nuts 56 rigidly hold the parts together.

A passage 58 in the inlet 8 connects with a pipe 60 rigidly and permanently mounted in the bracket 4. The pipe in turn delivers into a passage 62 in a lower retaining member 64. Between a ring 68 over the retaining member 64 and an upper ring 66, there is positioned the filtering medium 70 of the invention. The ring 66 removably is retained in position, as shown at 72, by a flange on the bracket 4, while the ring 68 removably is retained by a flange 73 on the retaining member 64. The filtering element comprises a stack of superposed metal plates 74, each alternate plate preferably being provided with projections 76 pressed therefrom to act as spacers between the plates. These spacers will leave between the plates a very narrow space, as shown at 78, across which the liquid passes. Any impurity in the liquid will be retained at the edge of the plates for the reason that the space is too small for the impurity to pass therebetween. Bolts 79 secure the plates together and to the rings 66 and 68, both rings and plates being provided with ears 81 and 83, respectively, to accommodate the bolts. The filtering element comprising, the metal plates 70 and rings 66 and 68, is removable as a unit.

The retaining member 64 is rigidly and permanently mounted relative to the pipe 60 and has the outlet passage 80 delivering into a valve chamber 82, secured by the machine screws 84 to the retaining member. The valve chamber has the outlet 86 leading to the interior of the container. A valve 88 is mounted on a stem 90 slidably positioned in an opening in the bottom of the chamber 82. A spring 92 constantly urges the valve to closing position.

The retaining member 64 is provided with an opening 94 arranged immediately above the opening 80 and a pipe 96 has its lower end permanently mounted in the opening 94 and extends upwardly into the pipe 32. A stem 98 is positioned in the pipe 96 and has the members 100 to guide it in its movement in the pipe. The lower end 102 of the stem is adapted to strike the valve 88 to hold it from its seat on the opening 80 when the filter is in normal working order, as shown in Figure 1. The upper end of the stem 98 has the valve 104 which closes the upper end of the pipe 96 when the filter is functioning. A coil spring 106 is positioned between the valve 104 and the lower end of the mounting member 22 to hold the valve and stem in place.

The plates or discs 74 have a central annular opening 108 so that when they are in position, as shown in Figure 1, they form a circular interior chamber 110. In this chamber, there is adapted to move or slide the wheel or disc 112 attached as at 114 to the lower end of the pipe 32. The wheel 112 has the spokes 116 which are bored or hollow, as shown at 118, and deliver into a peripheral groove 120. Suitable packing rings 122 in the periphery of the wheel form a substantially fluid tight connection with the filter plates. A nut and packing 124 form a fluid tight connection between the wheel 112 and the pipe 96.

The container has the sump 126 at its bottom and an outlet plug 128 may be removed to drain or clean the sump.

The operation of the filter is as follows: Liquid will enter the inlet 8 and follow the course of the arrows though the passage 58, pipe 60, passages 62, opening 80, chamber 82 and opening 86 to the interior of the casing between the casing and the filter 68. The pressure will force the liquid through the spaces 78 between the plates 74 and cause it to pass from the outlet 10 to any suitable place. Any impurity in the liquid will be unable to pass through the space 78 but will be retained at the edge of the filter 68. In due time, the impurities will clog the filter and prevent further filtration. A means is therefore provided to clean the filter.

The cleaning operation is best shown in Figure 2 and is as follows: Assuming the parts to be in the position shown in Figure 1 and the filter clogged, the operator turns the handle 26 to unscrew the nut 16 from the boss 12. This unscrewing will permit the lower spring 92 to press the stem 98 upward simultaneously closing the valve 88 on its seat and moving the valve 104 from its seat. This change in the position of the valves will now cause the incoming liquid to flow from the passage 62, into the pipe 96, past the valve 104 and into the pipe 32, through the passages 118 in the spokes 116, and then to the peripheral groove 120 in the wheel 112. Owing to the confined or restricted space of the groove 120, pressure will be built up and force the liquid through the filter plates in a direction opposite to the course it takes when the filter is normally functioning. This will force the impurities away from the outer edge of the filter and cause them to fall to the bottom of the container where they remain in the sump 126. The operator, after unscrewing the nut 16, slowly moves the wheel 112 along the interior of the filter to cause a cleaning of the entire filter surface. After the nut has been unscrewed, the pipe 32 and wheel 112 may be pulled, or pulled and rotated, along the length of the filter 70. When the filter has been cleaned by passing the wheel 112 along the entire interior filter length, the wheel, pipe and nut are again returned to the bottom of the filter stack and the nut 16 tightly screwed into place. The filter is now ready again to perform its filtering function.

In cleaning the filter by reversing the oil flow through the stack of plates, the cleaning is preferably done after a period of rest to allow the impurities in the oil to settle. The oil will then be in a cleaner state and be able to accomplish a more effective cleaning.

I claim:

1. In a filter including a filtering medium mounted in a container, an inlet conduit extending to one end of the medium and normally delivering liquid to the container, a valve at the delivery end of the conduit to control the flow of liquid through the conduit, a cleaning device, means to operate the valve to divert the flow of liquid, and means to cause the diverted liquid to pass through the cleaning device and through the filter in a reverse direction to clean the filter.

2. In a filter including a filtering medium mounted in a container, an inlet conduit leading to one end of the filtering medium and delivering the liquid to be filtered between the filtering medium and the container, the liquid passing through the filtering medium to the filter outlet, means to control the direction of flow of liquid from the delivery end of the inlet conduit, means to operate said control means to cause the liquid to flow to the interior of the filtering medium, means in the filter to direct the flow through a restricted part of the filtering medium to cause the liquid to clean the filtering medium.

3. In a filter including a filtering medium mounted in a container, an inlet to the container delivering liquid to be filtered between the container and the medium, a valve in the inlet, means to operate the valve to change the direction of flow of the liquid to the interior of the filter, and means to direct the diverted flow of liquid against a restricted part of the interior of the filtering medium to clean the medium.

4. In a filter including a filtering medium mounted in the container, an inlet to the container delivering the liquid to be filtered between the container and the medium, a pipe mounted in the filtering medium, means to divert the flow of the liquid from between the container and medium to the pipe, and means associated with the pipe for delivering the liquid against a restricted part of the outlet side of and causing it to pass through the filtering medium to clean the same.

5. In a filter including a filtering medium mounted in a container, an inlet conduit delivering the liquid to be filtered between the container and filtering medium, a pipe mounted in the filter inside the filtering medium, means to change the flow of the liquid from between the filtering medium and the container to the pipe, a second pipe surrounding the first pipe and out of contact with the filtering medium, and means in contact with the filtering medium and connected with the second pipe to force the flow of liquid directly against the filtering medium to cause it to pass therethrough in the reverse direction to clean the filter.

6. In a filter including a filtering medium mounted in a container, an inlet conduit delivering the liquid to be filtered between the container and the filtering medium, a pipe secured to the filter inside the filtering medium, a valve for changing the flow of liquid, means to operate the valve to cause the liquid to enter the pipe, a second pipe out of contact with the filtering medium and surrounding the first and receiving the liquid therefrom, and means on the second pipe in contact with the filtering medium to force the liquid against the filtering medium to cause liquid to pass through the medium in the reverse direction to clean the filter.

7. In a filter including a filtering medium mounted in a container, an inlet conduit delivering the liquid to be filtered between the container and the filtering medium, a pipe secured to the filter inside the filtering means, a valve for changing the flow of the liquid into the pipe, a second pipe around the first and receiving the liquid therefrom, means to move said second pipe, and means attached to the second pipe and receiving the liquid therefrom and directing the liquid against the filtering means to cause it to pass therethrough in the reverse direction to clean the filter, said last-named means movable with the said second pipe to effect a step-by-step cleaning of the filtering medium.

In testimony whereof I affix my signature

CHARLES W. McKINLEY.